(12) United States Patent
Ruppel et al.

(10) Patent No.: US 11,968,924 B2
(45) Date of Patent: Apr. 30, 2024

(54) HEADS FOR STRING TRIMMERS AND MOWERS

(71) Applicant: ARDISAM, INC., Cumberland, WI (US)

(72) Inventors: Robert John Ruppel, Cumberland, WI (US); Scott Andrew Waldal, Hudson, WI (US); Matthew Michael Oestreich, Cumberland, WI (US)

(73) Assignee: ARDISAM, INC., Cumberland, WI (US)

( * ) Notice: Subject to any disclaimer, the term of this patent is extended or adjusted under 35 U.S.C. 154(b) by 287 days.

(21) Appl. No.: 17/233,357

(22) Filed: Apr. 16, 2021

(65) Prior Publication Data

US 2021/0321561 A1 Oct. 21, 2021

Related U.S. Application Data

(60) Provisional application No. 63/012,848, filed on Apr. 20, 2020.

(51) Int. Cl.
*A01D 34/416* (2006.01)
*A01D 34/84* (2006.01)
*A01D 34/90* (2006.01)

(52) U.S. Cl.
CPC ..... *A01D 34/4163* (2013.01); *A01D 34/4165* (2013.01); *A01D 34/84* (2013.01); *A01D 34/90* (2013.01)

(58) Field of Classification Search
CPC ............ A01D 34/4163; A01D 34/4165; A01D 34/84; A01D 34/90
See application file for complete search history.

(56) References Cited

U.S. PATENT DOCUMENTS 4,086,700 A 5/1978 Inada
4,685,279 A * 8/1987 Gullett ................. A01D 34/416
30/276

(Continued)

FOREIGN PATENT DOCUMENTS

BR MU8802134 U2 8/2009
EP 2974586 B1 9/2017
JP 2005168452 A 6/2005

OTHER PUBLICATIONS

Earthquake , "28463 M205 Trimmer with 150cc 4-Cycle Viper Engine Walk Behind String Mower", URL: https://www.amazon.com/Earthquake-28463-String-Mower-Black/dp/B0757TSK3N, website visited Jan. 9, 2021.

(Continued)

*Primary Examiner* — Abigail A Risic
(74) *Attorney, Agent, or Firm* — Perkins Coie LLP

(57) ABSTRACT

A cutting head body for an agricultural machine, such as a mower or a trimmer, is configured to receive a cutting line for cutting weeds, grass, or other materials. The cutting head body includes an inlet area having a cavity with a node location configured to receive a node of a cutting line, and an outlet area having a cavity configured to open to an exterior of the cutting head body. The cutting head body may include a first passageway connecting the inlet area to the outlet area and a second passageway connecting the inlet area to the outlet area. The cutting head body is rotatable about a rotational axis to move the cutting line. In some embodiments, the cutting head body is fixed to a rotatable shaft. In some embodiments, the cutting head body rotates about a fixed shaft.

15 Claims, 12 Drawing Sheets

(56) References Cited

U.S. PATENT DOCUMENTS

| | | | |
|---|---|---|---|
| 4,905,465 A | 3/1990 | Jones et al. | |
| 5,048,278 A * | 9/1991 | Jones | A01D 34/4166 30/276 |
| 5,170,561 A * | 12/1992 | Sepke | A01D 34/4166 30/276 |
| 5,303,476 A * | 4/1994 | Tuggle | A01D 34/4166 30/276 |
| 6,094,823 A * | 8/2000 | Brown | A01D 34/416 30/276 |
| 6,176,015 B1 * | 1/2001 | Morabit | A01D 34/4168 30/276 |
| 6,314,848 B2 * | 11/2001 | Morabit | A01D 34/4166 83/13 |
| 6,363,616 B1 | 4/2002 | Kreissle | |
| 6,983,543 B2 * | 1/2006 | Fogle | A01D 34/4166 30/276 |
| 10,631,458 B2 * | 4/2020 | Morabit | A01D 34/4166 |
| 2006/0048396 A1 | 3/2006 | Legrand | |
| 2006/0191143 A1 | 8/2006 | Brandon | |
| 2015/0264862 A1 | 9/2015 | Skinner | |
| 2016/0143220 A1 * | 5/2016 | Child | A01D 34/4166 30/276 |
| 2017/0303468 A1 | 10/2017 | Nolin et al. | |
| 2018/0116120 A1 | 5/2018 | Reiter | |
| 2018/0368315 A1 * | 12/2018 | Jones | A01B 1/16 |
| 2020/0045881 A1 | 2/2020 | Cigarini | |
| 2020/0060080 A1 * | 2/2020 | Nevels | A01D 34/4166 |
| 2020/0253117 A1 * | 8/2020 | Guerra | A01D 34/733 |
| 2020/0329636 A1 * | 10/2020 | Chang | A01D 34/733 |

OTHER PUBLICATIONS

Husqvarna, "Straight Shaft String Trimmer", URL: https://www.northerntool.com/shop/tools/product_200700335_200700335; website visited Jan. 9, 2021.

Pivotrim, "Trimmer Head", URL: https://www.simplygoodstuff.com/pivotrim.html, website visited Jan. 9, 2021.

USPTO/ISA, "International Search Report and Written Opinion", Application No. PCT/US21/27824, dated Aug. 23, 2021.

USPTO (ISA/US), "Invitation to Pay Additional Fees", for PCT/US21/27824, dated Jun. 24, 2021.

* cited by examiner

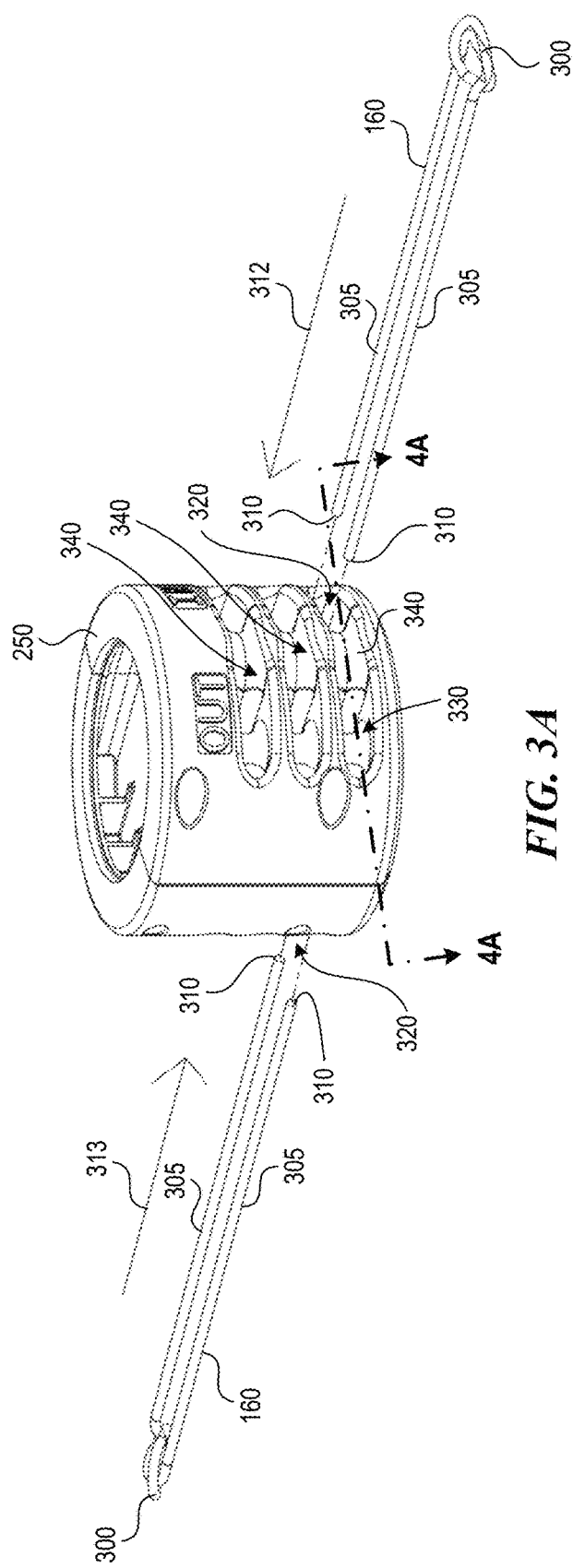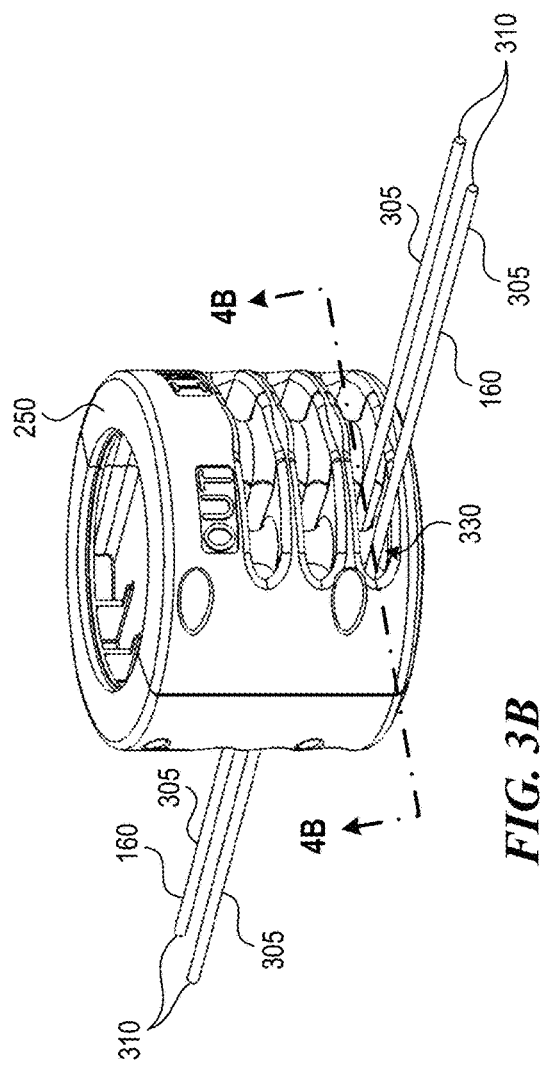
FIG. 3A
FIG. 3B

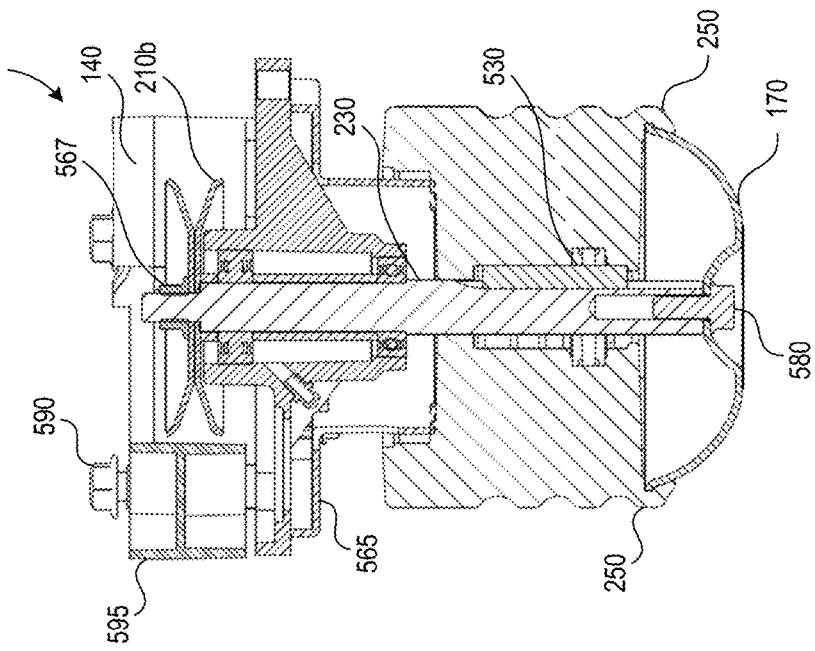
*FIG. 5C*
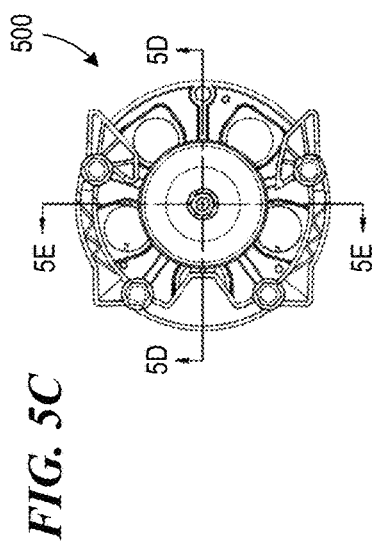
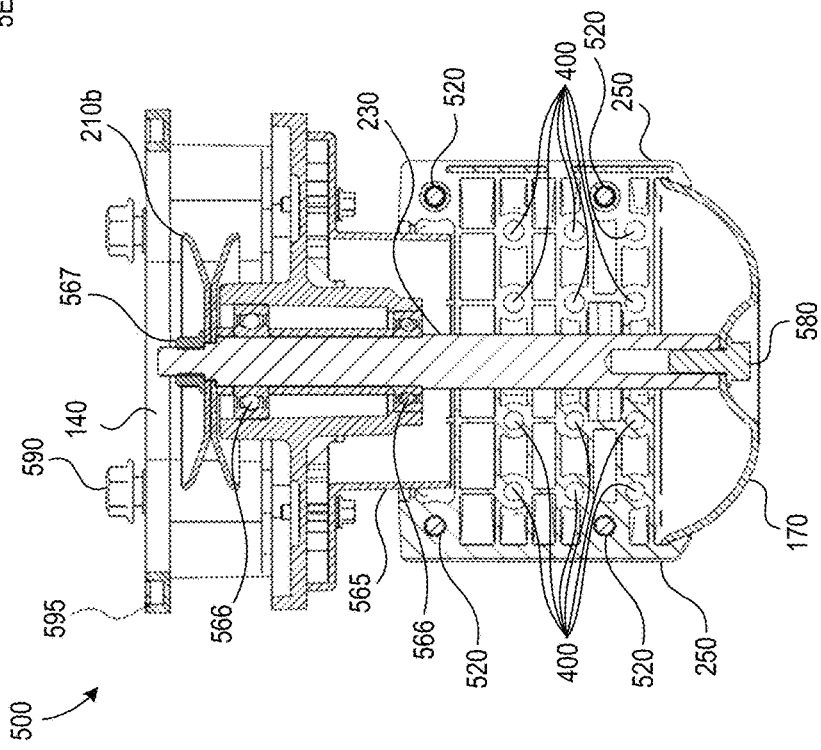
*FIG. 5D*
*FIG. 5E*

HEADS FOR STRING TRIMMERS AND MOWERS

CROSS-REFERENCE TO RELATED APPLICATION

The present application claims priority to U.S. Provisional Patent Application No. 63/012,848, filed Apr. 20, 2020, which is incorporated herein by reference in its entirety.

BACKGROUND

A typical string trimmer or mower includes a cutting head that holds a cutting line (sometimes called a cord or a string, which may generally be a strand of plastic, such as nylon, or metal). The cutting head is rotated to whip the cutting line at a high speed to cut weeds, grass, or other materials. Conventional cutting heads suffer from several disadvantages. For example, conventional cutting heads may include a large number of components, which increases manufacturing cost and complexity. Conventional cutting heads may also require a complicated loading procedure that unnecessarily complicates installation of the cutting line into the head. Further, conventional cutting heads may hold the cutting line in a manner that makes its removal difficult, especially when dirt or debris obstructs the cutting line. Cutting lines in conventional cutting heads may also become friction-welded together due to rubbing at high speeds, further complicating removal of the lines. Additionally, conventional cutting heads may collect debris around the head itself (sometimes called "weed wrap"), which may cause the trimmer or mower to bind, causing malfunction or damage.

SUMMARY

Representative embodiments of the present technology include a cutting head body for an agricultural machine, such as a mower or a trimmer, which is configured to receive a cutting line for cutting weeds, grass, or other materials. The cutting head body may include an inlet area having a cavity with a node location configured to receive a node of a cutting line, and an outlet area having a cavity configured to open to an exterior of the cutting head body. The cutting head body may include a first passageway connecting the inlet area to the outlet area and a second passageway connecting the inlet area to the outlet area. The cutting head body is rotatable about a rotational axis to move the cutting line. In some embodiments, the cutting head body is fixed to a rotatable shaft. In some embodiments, the cutting head body rotates about a fixed shaft.

Other features and advantages will appear hereinafter. The features described herein can be used separately or together, or in various combinations of one or more of them.

BRIEF DESCRIPTION OF THE DRAWINGS

Many aspects of the present technology are better understood with reference to the attached drawings. The components in the drawings are not necessarily to scale. Instead, emphasis is placed on clearly illustrating the principles of the present technology. In the drawings and description, the same reference number indicates the same element throughout the views and description.

FIGS. 3A and 3B illustrate perspective views of a cutting head body configured in accordance with embodiments of the present technology. FIG. 3A also illustrates a process for installing two cutting lines into the cutting head body. FIG. 3B also illustrates the cutting lines installed in the cutting head body.

FIG. 4A is a cross-section of FIG. 3A, and it shows line passageways configured to receive the cutting lines in the cutting head body. FIG. 4B is a cross-section of FIG. 3B, and it shows the cutting lines installed in the cutting head body and positioned in the line passageways.

FIG. 5C illustrates a top view of the cutting head assembly shown in FIGS. 5A and 5B.

FIG. 5D illustrates a cross-sectional view of the cutting head assembly shown in FIGS. 5A and 5B.

FIG. 5E illustrates another cross-sectional view of the cutting head assembly shown in FIGS. 5A and 5B.

DETAILED DESCRIPTION

The present technology is directed to heads for string trimmers and mowers, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as structures or functions common to trimmers, mowers, engines, or transmissions, may not be shown or described in detail to avoid unnecessarily obscuring the relevant description of the various embodiments. Accordingly, embodiments of the present technology may include additional elements or exclude some of the elements described below with reference to FIGS. 1-8, which illustrate examples of the technology.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components. Numerical adjectives such as "first" and "second," as used in the present disclosure, do not convey hierarchy or specific features or functions. Rather, such numerical adjectives are intended to aid the reader in distinguishing between elements which may have similar nomenclature, but which may differ in position, orientation, or structure. Accordingly, such numerical adjectives may be used differently in the claims.

Specific details of several embodiments of the present technology are described herein with reference to trimmers and mowers. However, the present technology may be implemented in any suitable device or machine that involves rapidly rotating a cord or a string to carry out a cutting action. The present technology may be used in various agricultural machines (including machines for gardening or yardwork), such as wheeled trimmers, handheld trimmers, motor-driven platform trimmers or mowers, walk-behind mowers, riding mowers, or other machines.

Figure 1:
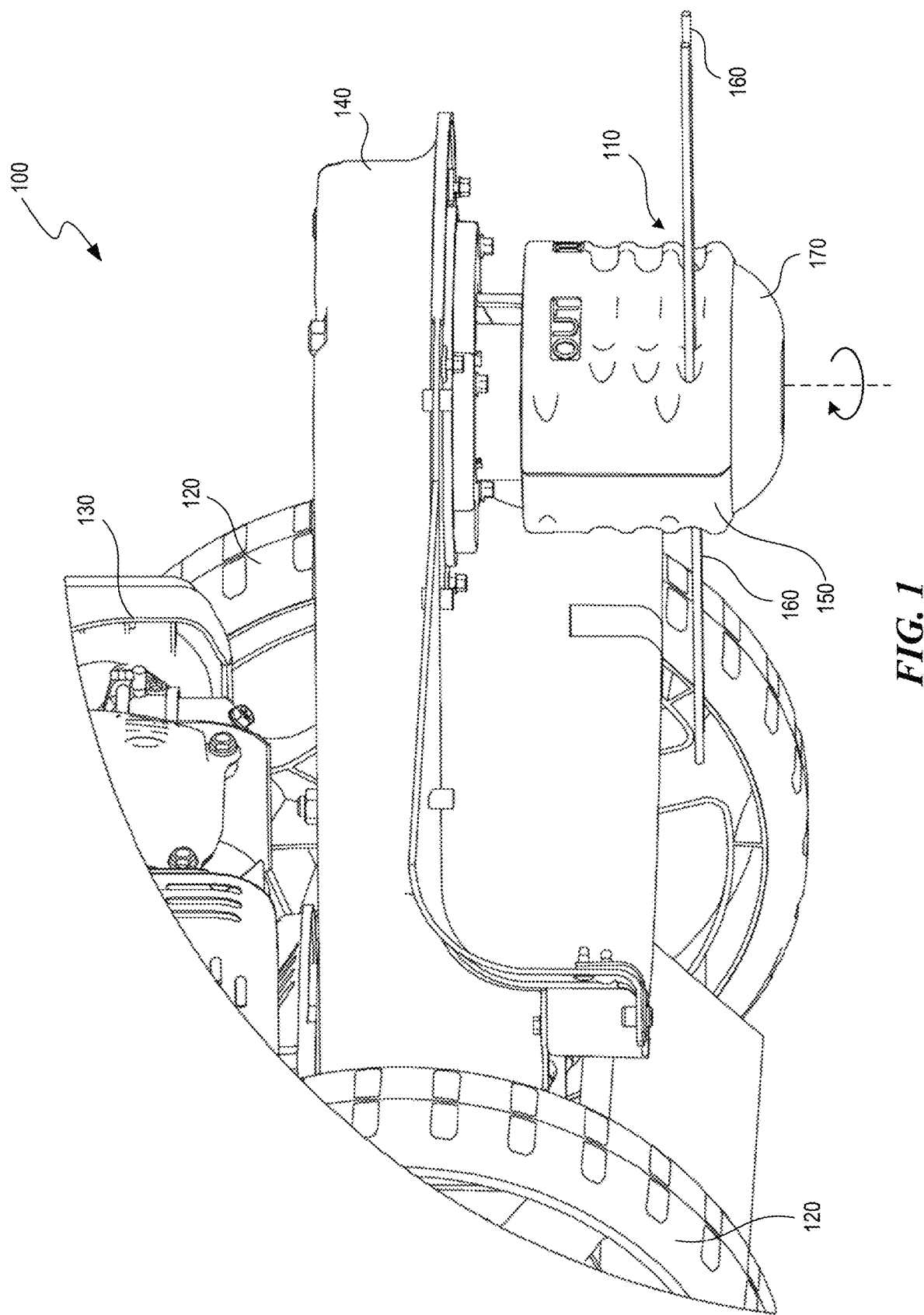
FIG. 1 illustrates a partial view of a string mower including a cutting head assembly configured in accordance with embodiments of the present technology.

Turning now to the drawings, FIG. 1 illustrates a partial view of a string mower 100 including a cutting head assembly 110 configured in accordance with embodiments of the present technology. For context, the string mower 100 may include wheels 120 (for propelling the string mower 100 or to facilitate pushing the string mower 100), a motor 130 (which may be an electric motor, internal combustion engine, or other suitable motor) to power the cutting head assembly 110 (and, optionally, to power the wheels 120), and a chassis 140 to support the cutting head assembly 110. FIG. 1 illustrates only part of the string mower 100 because it is understood that wheels and motors in a string mower 100 are conventional and therefore unnecessary to show in full detail. Although a string mower 100 is illustrated, in various embodiments, a string trimmer may implement the cutting head assembly 110. In other embodiments, other machines may include the cutting head assembly 110.

The cutting head assembly 110 may include a cutting head body 150, which holds one or more cutting lines 160. In some embodiments, the cutting head assembly 110 may include a bump head 170, which may protect the cutting head body 150 from impacts with the ground, or which may function as a spacer between the cutting head body 150 and the ground to elevate the one or more cutting lines 160 above the ground to an appropriate cutting level. The bump head 170 may be a partially spherical or convex structure. In operation, the cutting head assembly 110 spins about an axis that is generally perpendicular to the ground. As the cutting head assembly 110 spins, the cutting lines 160 extend generally outward due to centrifugal force. The cutting lines 160 move at such a speed that they cut grass, weeds, or other plants.

Figure 2:
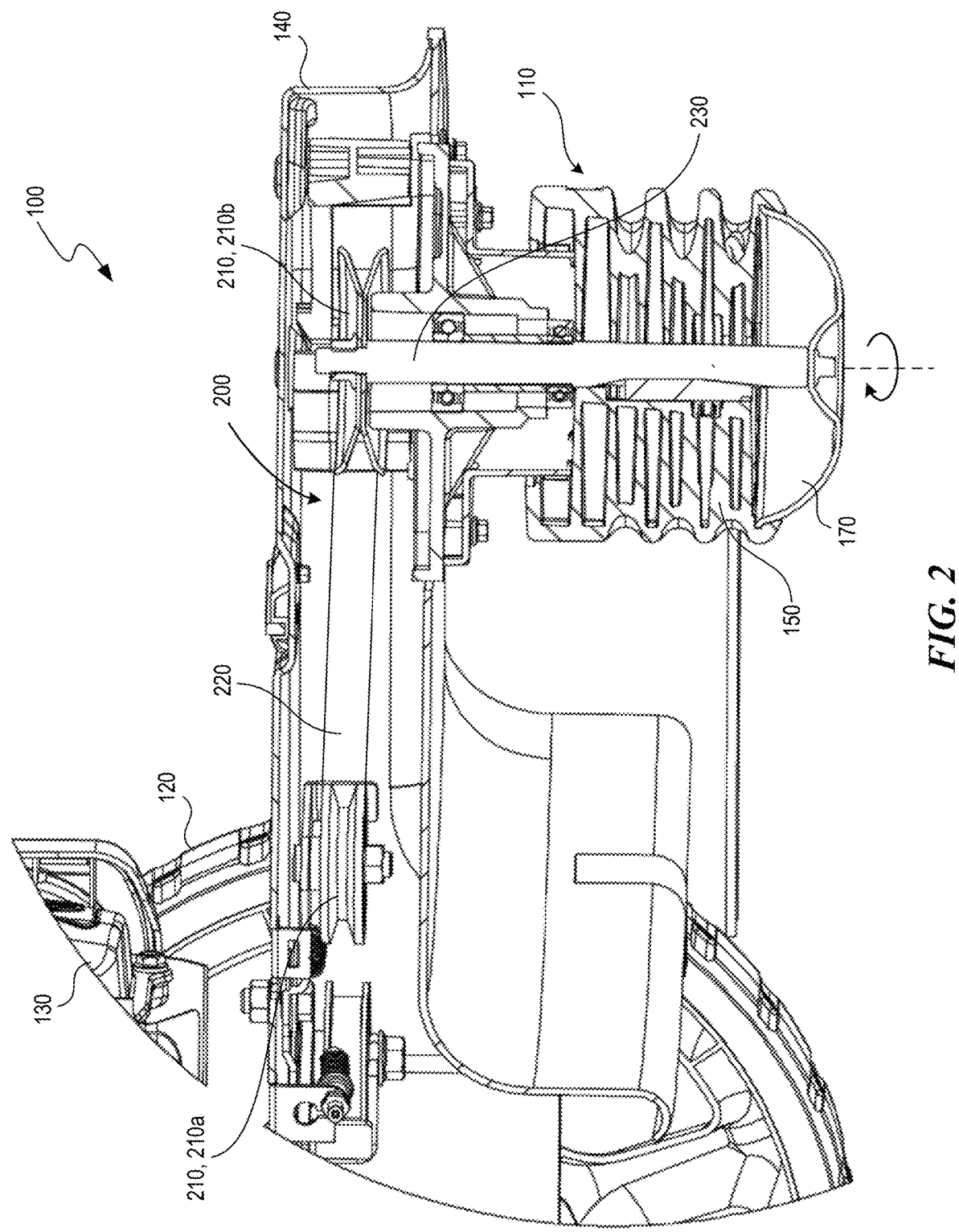
FIG. 2 illustrates a partial cross-sectional view of the string mower shown in FIG. 1.

FIG. 2 illustrates a partial cross-sectional view of the string mower 100 shown in FIG. 1. In some embodiments, the cutting head assembly 110 may be driven (rotated) by a transmission system 200 connecting the motor 130 to the cutting head assembly 110. In some embodiments, the transmission system 200 may include a belt transmission with a suitable number of pulleys 210 interconnected by a belt 220. For example, a driving pulley 210a driven by the motor 130 (directly or indirectly) may drive the belt 220, which in turn drives a driven pulley 210b.

In some embodiments, the cutting head assembly 110 may include a driveshaft 230 connected to the driven pulley 210b. The cutting head body 150 may be fixed to the driveshaft 230. Accordingly, rotation of the driven pulley 210b causes the driveshaft 230 to rotate, which rotates the cutting head body 150 and spins the cutting lines 160 (see FIG. 1).

In other embodiments, the driven pulley 210b may be fixed to the cutting head body 150 such that the driven pulley 210b directly drives the cutting head body 150 around a stationary shaft or bearing (for example, the driveshaft 230 may be a stationary shaft about which the cutting head body 150 rotates). In some embodiments, the transmission system 200 may include a gear transmission connecting the motor 130 to the cutting head assembly 110. In further embodiments, the motor 130 may directly drive the cutting head assembly 110, or other transmission systems may be used to connect the motor 130 to the cutting head assembly 110. Various embodiments of the present technology include any suitable manner of providing rotation to the cutting head assembly 110 (specifically, to the cutting head body 150).

FIGS. 3A, 3B, 4A, and 4B illustrate a cutting head body 250 configured in accordance with embodiments of the present technology. The cutting head body 250 is suitable for use as the cutting head body 150 described above with regard to FIGS. 1 and 2. Accordingly, cutting head assemblies configured in accordance with embodiments of the present technology may include the cutting head body 250.

FIG. 3A illustrates a perspective view of the cutting head body 250, and schematically illustrates a process of installing two cutting lines 160 into the cutting head body 250. FIG. 3A also shows the cutting lines 160 prior to installation in the cutting head body 250. In some embodiments, a cutting line 160 may include a single integral cutting line with a node 300 positioned approximately halfway along its length between free ends 310, such that the cutting line 160 includes two cutting-line portions 305 that meet and connect at the node 300. The cutting line 160 may include the cutting-line portions 305 or ends 310 extending in parallel with each other away from the node 300 along the same direction, with the node 300 being positioned opposite the ends 310. In some embodiments, the node 300 may be in the form of a knot tied in the cutting line 160. In some embodiments, the node 300 may be in the form of a bend in the cutting line 160. In some embodiments, the node 300 may include a clamp or protuberance along the cutting line 160. In some embodiments, the cutting line 160 may be formed with two cutting-line portions 305 that are separate but connected at the node 300.

To install the cutting lines 160 in the cutting head body 250, a user moves or pushes the free ends 310 (opposite the node 300) of the cutting lines 160 into the cutting head body 250, for example, along radially inward directions 312, 313.

FIG. 3B illustrates a perspective view of the cutting head body 250 with the cutting lines 160 installed therein. The ends 310 extend away from the cutting head body 250 and the nodes 300 (which are not visible in FIG. 3B) are inside the cutting head body 250. After installation, the portions 305 or ends 310 may extend out of the cutting head body in parallel with each other. When the cutting head body 250 rotates, the cutting-line portions 305 tend to pull radially away from the cutting head body 250, which locks the nodes 300 in the cutting head body 250. Installation of the cutting lines 160 is described in additional detail below. Although two cutting lines 160 are shown, in some embodiments, more or fewer cutting lines 160 may be installed in the cutting head body 250.

Figure 4A:
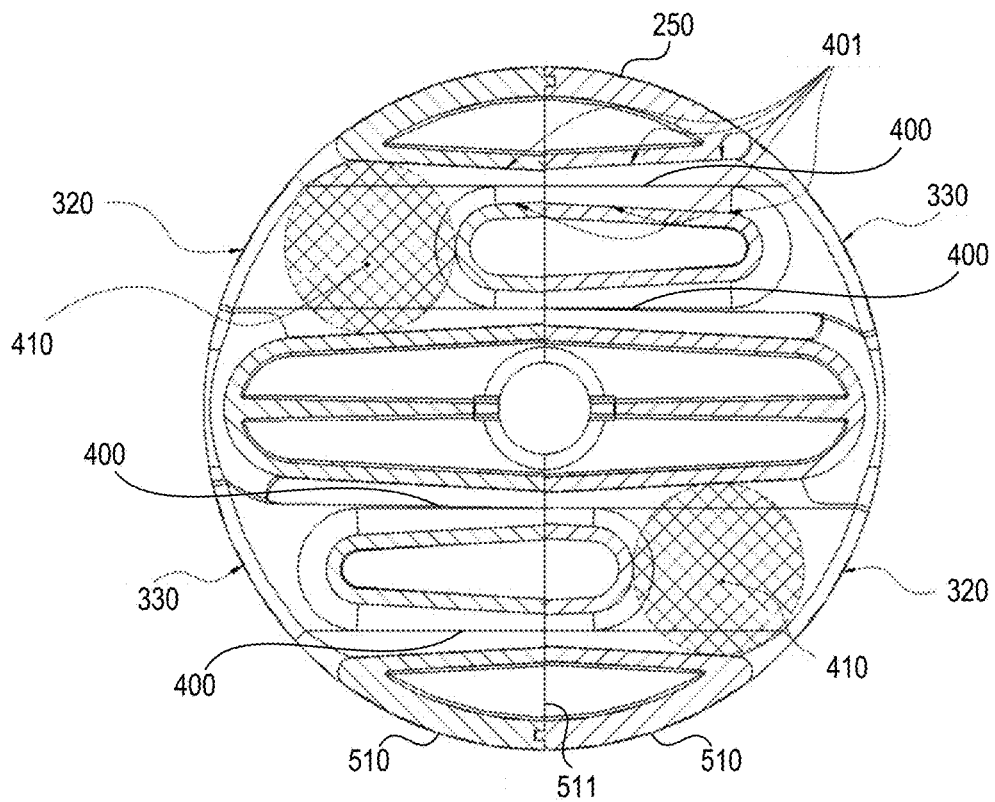
FIGS. 4A and 4B illustrate cross-sectional views of the cutting head body shown in FIGS. 3A and 3B.
Figure 4B:
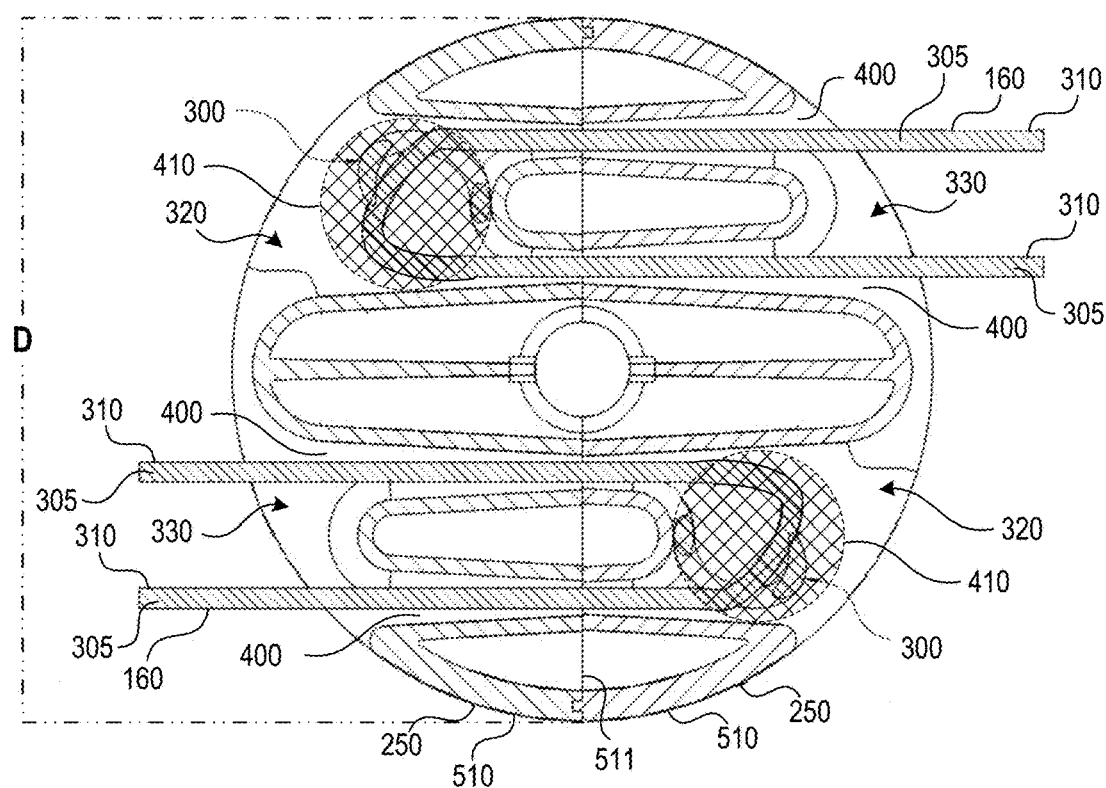

FIGS. 4A and 4B illustrate cross-sectional views of the cutting head body 250. Specifically, FIG. 4A is a cross-section of FIG. 3A (taken perpendicular to the axis of the generally cylindrical shape forming the cutting head body 250), and it shows line passageways 400 configured to receive the cutting lines 160 in the cutting head body 250. FIG. 4B is a cross-section of FIG. 3B (likewise taken perpendicular to the axis of the generally cylindrical shape forming the cutting head body 250), and it shows cutting lines 160 installed in the cutting head body 250, and positioned in the line passageways 400.

Referring to FIGS. 3A, 3B, 4A, and 4B, the ends 310 of each cutting line 160 are placed in an inlet area 320 of the cutting head body 250, passed through the line passageways 400 in the cutting head body 250, and passed out of an outlet area 330 of the cutting head body 250. The inlet area 320 and the outlet area 330 may each be a cavity or recess in the cutting head body 250, and they may be connected with the passageways 400. The inlet area 320 is configured to receive and hold the node 300. The outlet area 330 opens to the outside of the cutting head body 250, and it may include two discharge cavities in the form of the ends of each passageway 400. Accordingly, the cutting line 160 enters the inlet area 320, passes through the passageways 400, and exits through the two discharge cavities of the passageways 400 in the outlet area 330. The node 300 remains in the inlet area 320 and prevents the cutting line 160 from passing completely through the cutting head body 250, and it locks the cutting line 160 in the cutting head body 250 while the cutting head body 250 is rotating. When a user wants to replace the cutting line 160, the user may pull the existing cutting line 160 (for example, by grasping the node 300 or by pushing on one or both of the ends 310 to force the node 300 out of the inlet area 320) out of the cutting head body 250, and position a new cutting line 160 in the cutting head body 250.

In some embodiments, each inlet area 320 and each outlet area 330 corresponds to two line passageways 400 (one for each cutting-line portion 305 of a cutting line 160), which keep the cutting-line portions 305 of each cutting line 160 generally separate from each other inside the cutting head body 250 (each cutting-line portion 305 passes through one passageway 400). In some embodiments, each passageway 400 is fully or at least partially separated from each other passageway 400 by a line guide route or dividing structure 401, which may be a wall inside the cutting head body 250 forming the passageway 400 itself. Such an arrangement separates the cutting-line portions 305 within the cutting head body 250 and also helps separate the cutting-line portions 305 outside of the cutting head body 250, which helps reduce the risk that the cutting-line portions 305 will cross, which could otherwise reduce their durability. Such an arrangement also prevents the cutting-line portions 305 from welding together due to high-frequency rubbing, which could otherwise increase the difficulty of removing a cutting line.

In some embodiments, a cutting head body 250 may include only one inlet area 320 and only one outlet area 330, and corresponding passageways 400, such that the cutting head body 250 can accommodate only one cutting line 160 (which includes two cutting-line portions 305 protruding from the cutting head body 250). In some embodiments, a cutting head body 250 may include two inlet areas 320 and two outlet areas 330, and corresponding passageways 400, such that the cutting head body 250 accommodates two cutting lines 160. In some embodiments, one side of the cutting head body 250 may have an inlet area 320 and an outlet area 330. In other embodiments, one side of the cutting head body 250 may include both inlet areas 320, and the other side may include both outlet areas 330.

With specific regard to FIGS. 3A and 3B, the cutting head body 250 may include multiple levels 340 (such as two, three, four, or more levels 340), each of which may include inlets 320, outlets 330, and corresponding passageways 400. Multiple levels 340 allow a user to select a height of the cutting line 160 relative to the ground, or a user may include additional cutting lines 160 (for example, one or more cutting lines 160 on each level 340) for customizing the cutting performance. Having multiple cutting lines 160 at multiple levels may increase cutting performance by clearing away material from the cutting head assembly instead of recirculating the material.

With specific regard to FIGS. 4A and 4B, the cutting head body 250 includes a node location 410 where the node 300 is positioned when the cutting line 160 is installed in the cutting head body 250. The node location 410 may be configured (such as sized and shaped) to facilitate seating the node 300 in the node location 410. For example, the node location 410 may be sufficiently tight to keep a knot from unraveling (because nylon cord tends to be stiff and tends to unravel itself). As the cutting head body 250 spins, the cutting-line portions 305 of the cutting line 160 tend to straighten in the passageways 400, which helps prevent the cutting line 160 from binding in (and being difficult to remove from) the cutting head body 250. In some embodiments, the outlet areas 330 include large radiuses at their edges to reduce sharp bends in the cutting line 160 that would otherwise increase the risk of the line breaking. In some embodiments, the cutting head body 250 may have an overall diameter D of approximately 5.5 inches, or other dimensions. A relatively large diameter reduces the risk of "weed wrap."

Figure 5A:
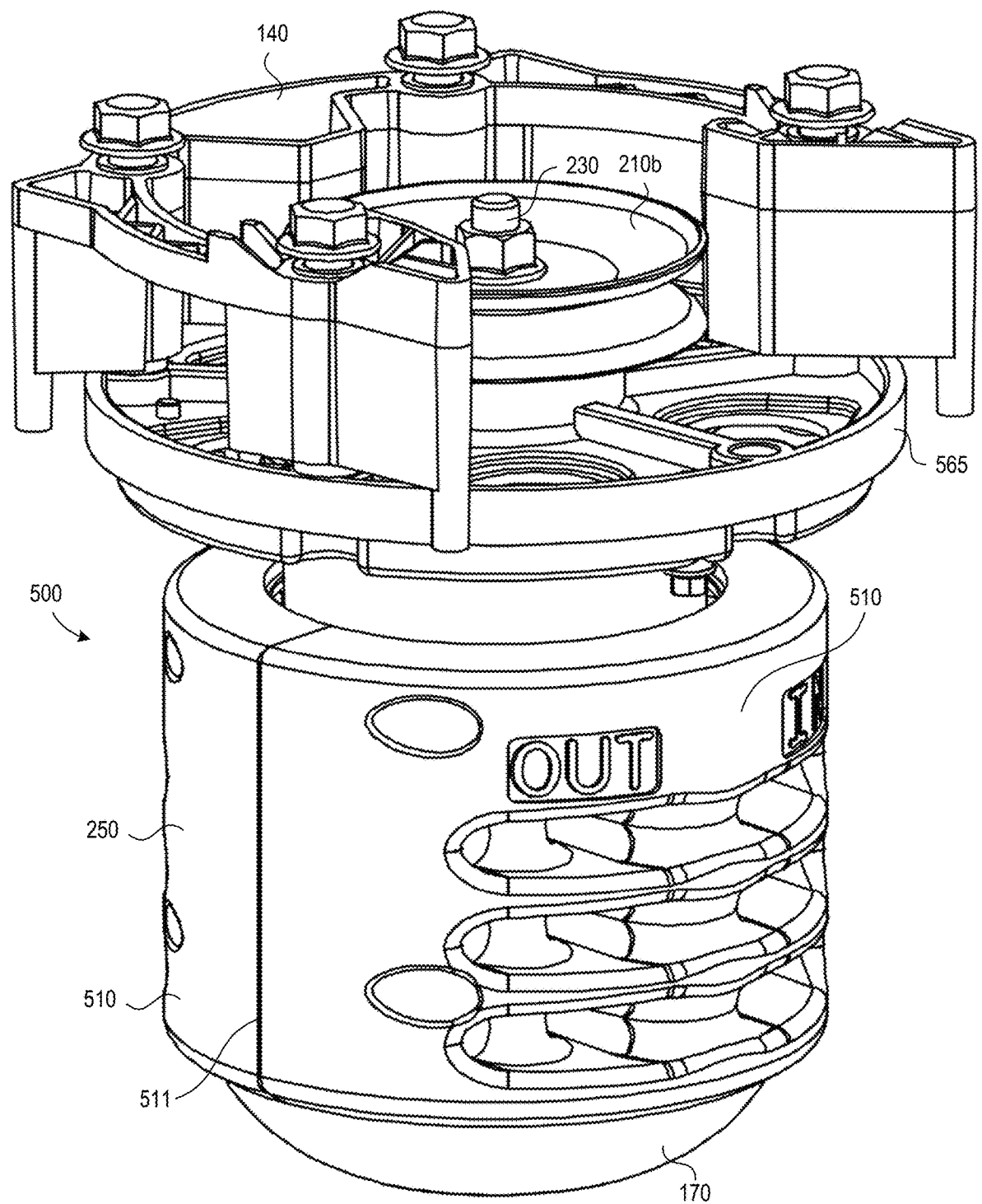
FIG. 5A illustrates a perspective view of a cutting head assembly configured in accordance with embodiments of the present technology.
Figure 5B:
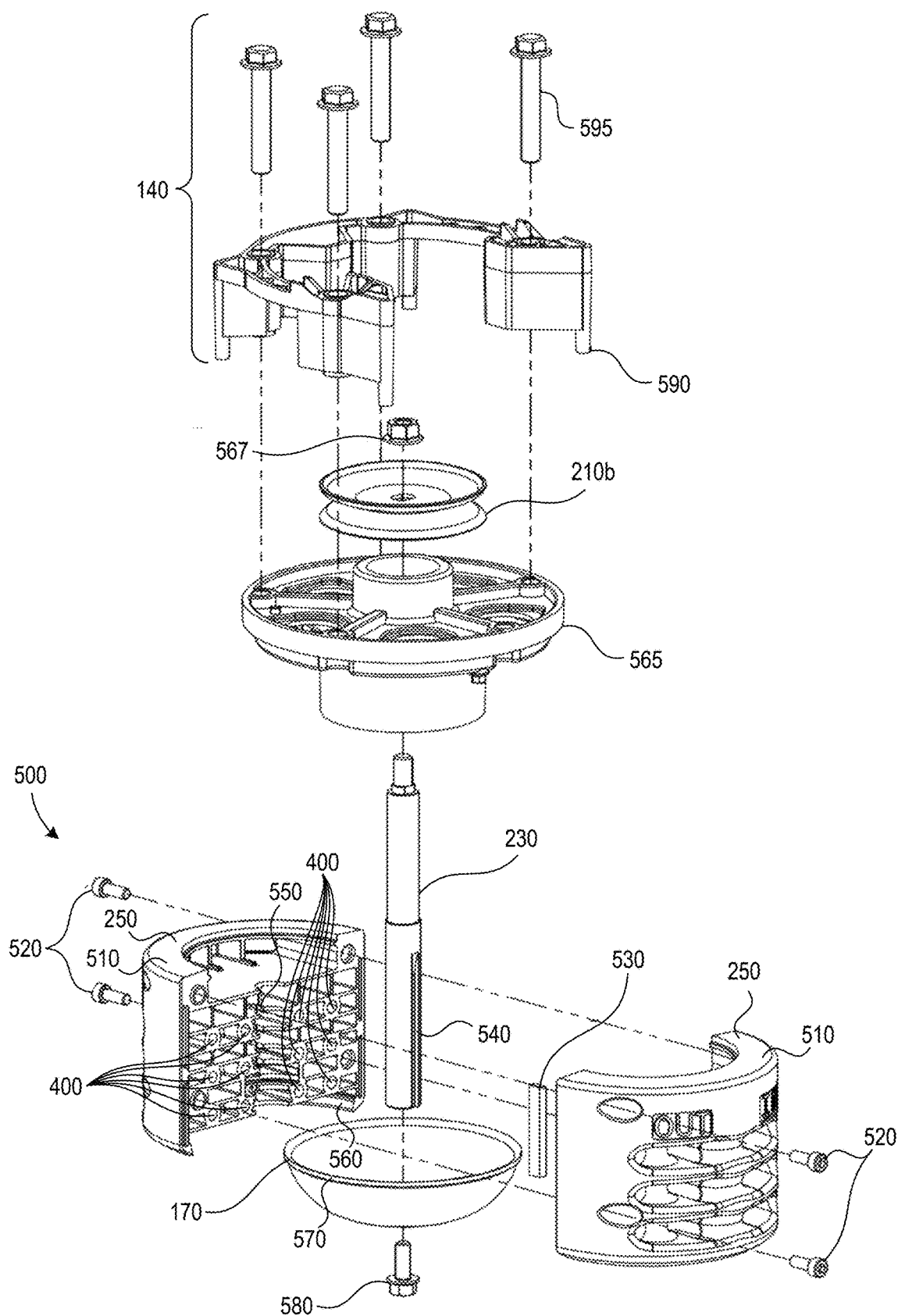
FIG. 5B illustrates a perspective exploded view of the cutting head assembly shown in FIG. 5A.

FIG. 5A illustrates a perspective view of a cutting head assembly 500 configured in accordance with embodiments of the present technology. FIG. 5B illustrates a perspective exploded view of the cutting head assembly 500 shown in FIG. 5A, showing several components of the cutting head assembly 500. With reference to FIG. 5A and FIG. 5B, the cutting head assembly 500 may be driven by the driveshaft 230, which is a rotating shaft that may be driven by the driven pulley 210b. In some embodiments, the cutting head body 250 may be formed in two separate portions 510, which may optionally be identical halves, or at least generally similar halves, to simplify manufacturing. The portions 510 may meet at a split line 511 (see FIG. 5A). The portions 510 may be held together around the driveshaft 230 by one or more fasteners 520 or by other attachment methods. In some embodiments, however, the cutting head body 250 may be formed as a single integral element. In some embodiments, the passageways 400 may be tapered so that they are the narrowest at the split line 511 between the portions 510 (see FIGS. 4A and 4B). However, in some embodiments, the passageways 400 may not be narrowest at the split line 511 (e.g., they may have a uniform or generally uniform width along some or all of their length).

Referring specifically to FIG. 5B, the cutting head body 250 may be keyed to the driveshaft 230 to transmit torque from the driveshaft 230 to the cutting head body 250. For example, the cutting head assembly 500 may include a key element 530, which may be an elongated, generally rectangular bar, or another suitable shape. The key element 530 fits into and engages a slot 540 in the driveshaft 230. The key element 530 may also fit into, and engage, a corresponding keyway 550 in the cutting head body 250. The keyway 550 in the cutting head body 250 may also be a slot, although it may be a discontinuous slot, depending on any interior voids in the cutting head body 250 (in some embodiments, the overall weight of the cutting head body 250 may be reduced by having voids or areas of omitted material in the cutting head body 250).

In some embodiments, in addition to the key element 530, or alternative to the key element 530, the driveshaft 230 may include one or more splines that engage corresponding slots in the cutting head body 250. In other embodiments, the cutting head body 250 or the driveshaft 230 may be configured to transmit torque from the driveshaft 230 to the cutting head body 250 in other suitable ways. In some embodiments, the driveshaft 230, the cutting head body 250, and the bump head 170 may be supported on the chassis 140 with a shaft bearing holder element 565 (which may hold the driveshaft 230 in a spindle arrangement). The driveshaft 230 may pass through the shaft bearing holder element 565 and through the driven pulley 210b to connect to one or more fasteners 567. The fastener 567 may be configured to support the driveshaft 230 as the driveshaft 230 supports the cutting head body 250 and the optional bump head 170. The shaft bearing holder element 565 may include one or more bearings 566 (see FIG. 5D) to support the driveshaft 230 and facilitate rotation of the driveshaft 230.

In some embodiments, the cutting head body 250 may include a circumferential groove 560 shaped to receive a lip 570 on the bump head 170 to hold the bump head 170 in the cutting head assembly 500 when it is assembled. One or more fasteners 580 may be positioned to pass through the bump head 170 to hold the cutting head body 250 and the bump head 170 on the driveshaft 230 (for example, to prevent the components from moving axially along the driveshaft 230). In some embodiments, the bump head 170 may be an integral part of the cutting head body 250. In some embodiments, the driven pulley 210b or other components may be formed as identical, or substantially identical, half-portions that are connected together around the driveshaft 230. A deck mounting bracket 590 attached to the chassis 140 with one or more deck mounting fasteners 595 may support the cutting head assembly 500 on the chassis 140. The deck mounting fasteners 595 may also support the shaft bearing holder element 565 and connect the shaft bearing holder element 565 to the deck mounting bracket 590.

FIG. 5C illustrates a top view of the cutting head assembly 500 shown in FIGS. 5A and 5B. FIG. 5D illustrates a cross-sectional view of the cutting head assembly 500, taken across the line indicated by the annotation 5D-5D in FIG. 5C. FIG. 5E illustrates a cross-sectional view of the cutting head assembly 500, taken across the line indicated by the annotation 5E-5E in FIG. 5C. FIGS. 5C, 5D, and 5E each show additional details of several components described herein.

Figure 6A:
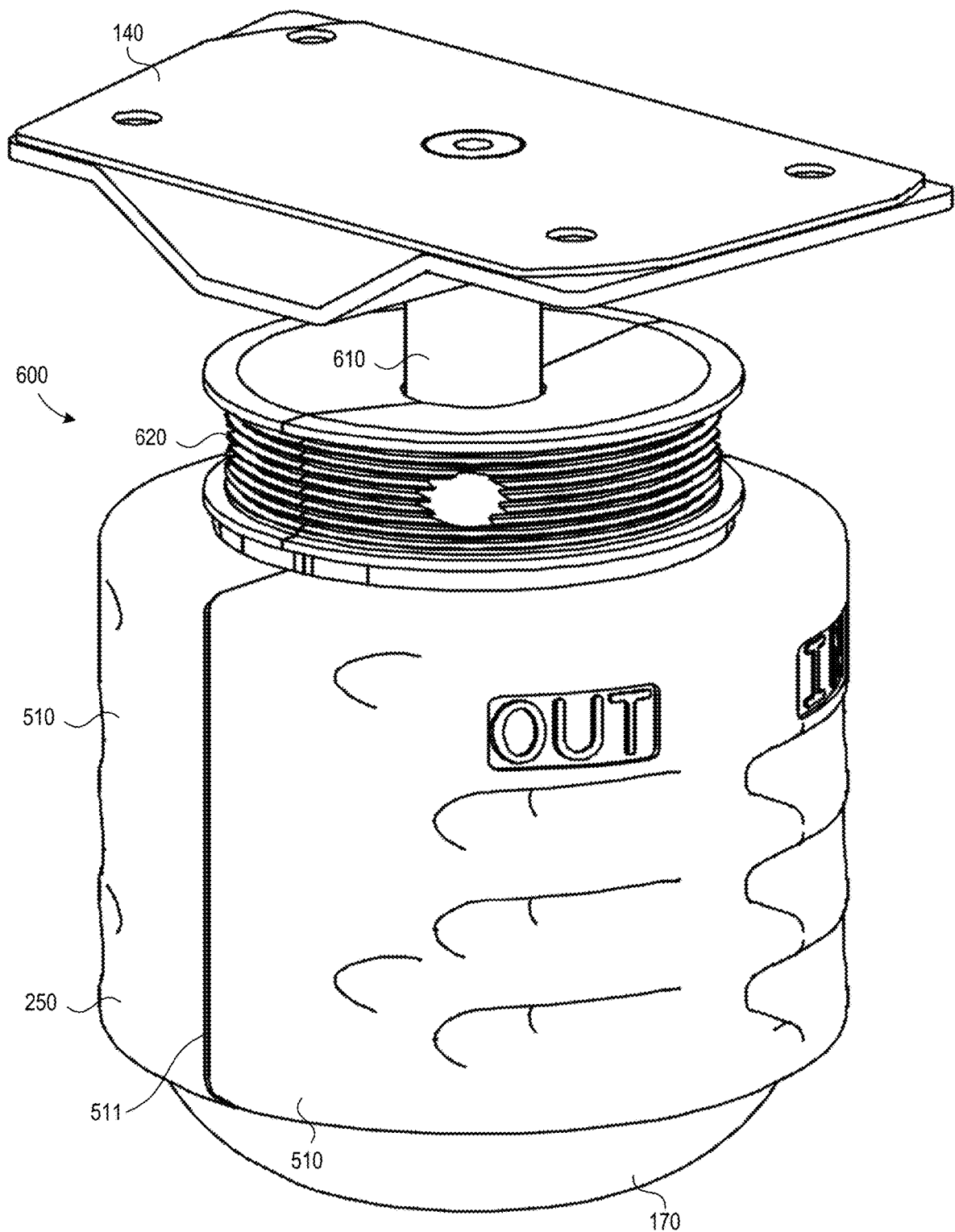
FIG. 6A illustrates a perspective view of a cutting head assembly configured in accordance with embodiments of the present technology.
Figure 6B:
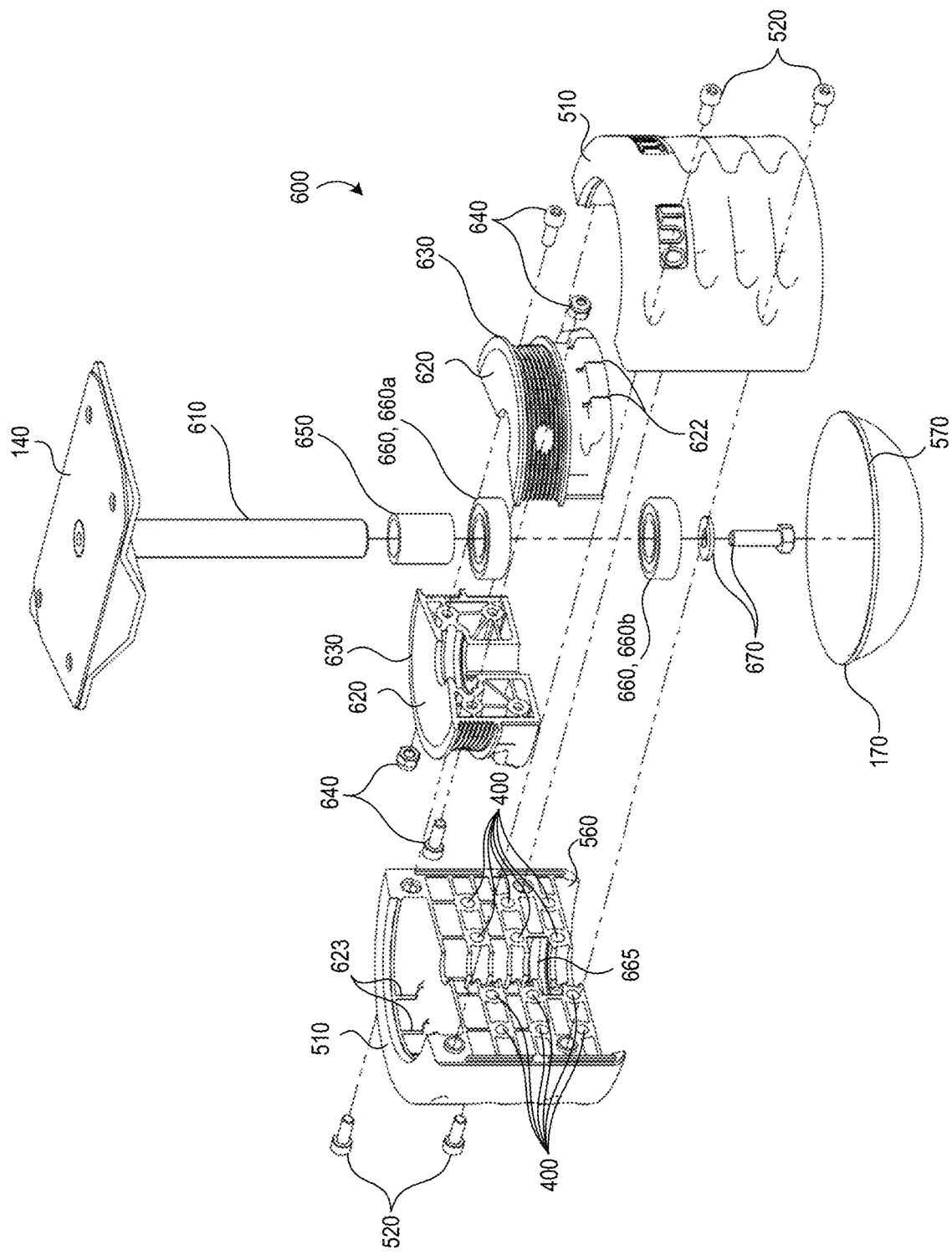
FIG. 6B illustrates a perspective exploded view of the cutting head assembly shown in FIG. 6A.

FIG. 6A illustrates a perspective view of a cutting head assembly 600 configured in accordance with embodiments of the present technology. FIG. 6B illustrates a perspective exploded view of the cutting head assembly 600 shown in FIG. 6A, showing several components of the cutting head assembly 600. With reference to FIGS. 6A and 6B, the cutting head assembly 600 may include the cutting head body 250 described above or a cutting head body that is generally similar to the cutting head body 250 described above (for example, with inlet areas, outlet areas, and passageways to accommodate a cutting line). Instead of a rotating shaft driving the cutting head body 250, however, the cutting head assembly 600 (specifically, the cutting head body 250) is supported on a fixed shaft 610, which may be fixed to the chassis 140. Accordingly, the cutting head body 250 may rotate around the fixed shaft 610 to spin the cutting lines 160.

A driven pulley 620 may be supported by the fixed shaft 610 and positioned to rotate about the fixed shaft 610. Likewise, the cutting head body 250 may be supported by the fixed shaft 610 and positioned to rotate about the fixed shaft 610. The driven pulley 620 may be similar to the driven pulley 210b described above with regard to FIGS. 2, 5A, and 5B but, instead of driving a shaft, the driven pulley 620 is fixed to the cutting head body 250 to drive the cutting head body 250 itself. With reference to FIG. 6B, in some embodiments, the driven pulley 620 includes grooves or ribs 622, which engage corresponding grooves or ribs 623 in the cutting head body 250 to transmit rotation from the driven pulley 620 to the cutting head body 250.

In some embodiments, the driven pulley 620 may be formed in two separate halves 630 (held together around the shaft 610, for example, by one or more fasteners 640), which may optionally be identical or at least generally similar to simplify manufacturing. In some embodiments, however, the driven pulley 620 may be formed as a single integral element. In some embodiments, the cutting head assembly 600 may be axially aligned on the fixed shaft 610 with a spacer 650. The spacer 650 prevents the cutting head body 250 from moving upward along the fixed shaft 610.

One or more bearings 660 may be positioned on the shaft 610 to facilitate rotation of the various components of the cutting head assembly 600 on the shaft 610. For example, an upper bearing 660a positioned between the driven pulley 620 and the fixed shaft 610 may facilitate rotation of the driven pulley 620 relative to the fixed shaft 610. A lower bearing 660b positioned between the cutting head body 250 and the fixed shaft 610 may facilitate rotation of the cutting head body 250 relative to the fixed shaft 610. The bearings 660 may optionally be ball bearings or other suitable bearing devices. In some embodiments, one or more fastener elements 670 may fasten the lower bearing 660b on the fixed shaft 610, while a lower portion of the cutting head body 250 may be supported on the fixed shaft 610 by the lower bearing 660b. The cutting head body 250 may include a pocket 665 shaped to receive the lower bearing 660b. The bump head 170 may be held in position by the groove 560 of the cutting head body.

Figure 6C:
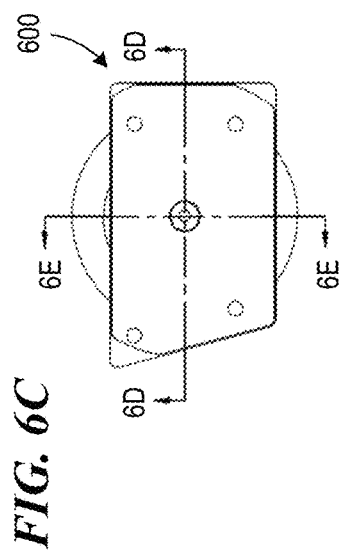
FIG. 6C illustrates a top view of the cutting head assembly shown in FIGS. 6A and 6B.
Figure 6E:
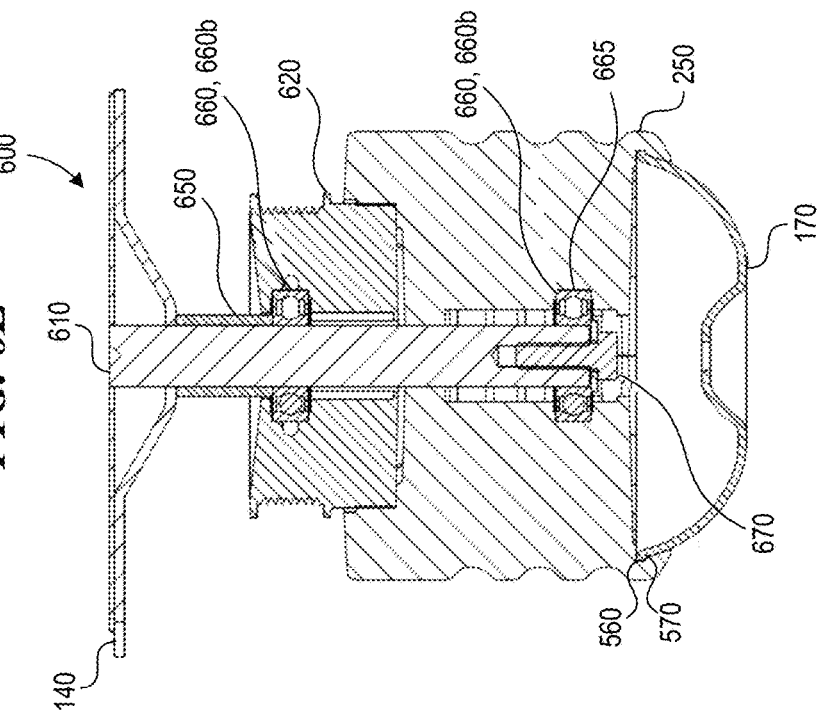
FIG. 6E illustrates another cross-sectional view of the cutting head assembly shown in FIGS. 6A and 6B.
Figure 6D:
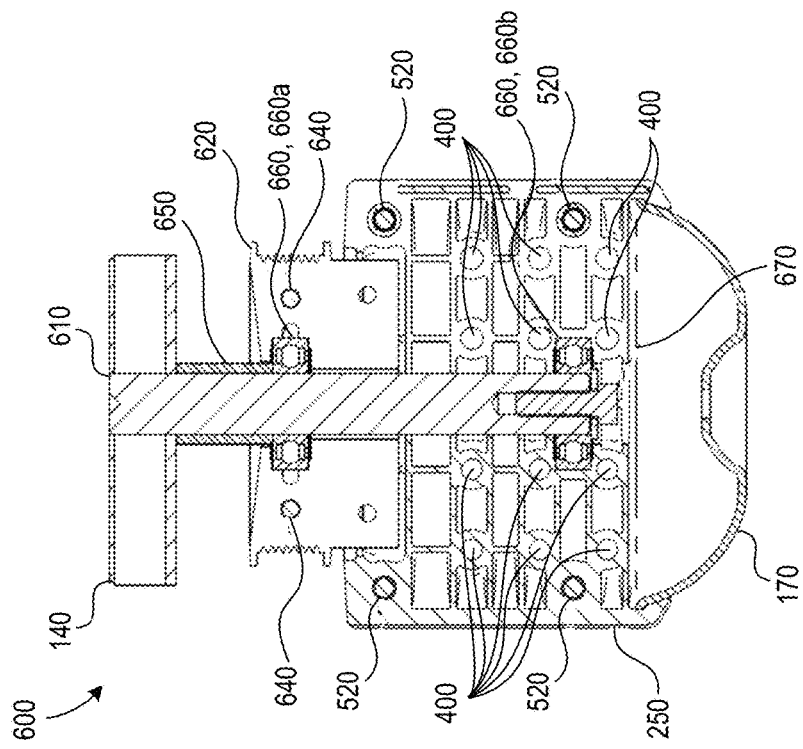
FIG. 6D illustrates a cross-sectional view of the cutting head assembly shown in FIGS. 6A and 6B.

FIG. 6C illustrates a top view of the cutting head assembly 600 shown in FIGS. 6A and 6B. FIG. 6D illustrates a cross-sectional view of the cutting head assembly 600 shown in FIGS. 6A and 6B, taken across the line indicated by the annotation 6D-6D in FIG. 6C. FIG. 6E illustrates a cross-sectional view of the cutting head assembly 600 shown in FIGS. 6A and 6B, taken across the line indicated by the annotation 6E-6E in FIG. 6C. FIGS. 6C, 6D, and 6E each show additional details of several components described herein.

Figure 7:
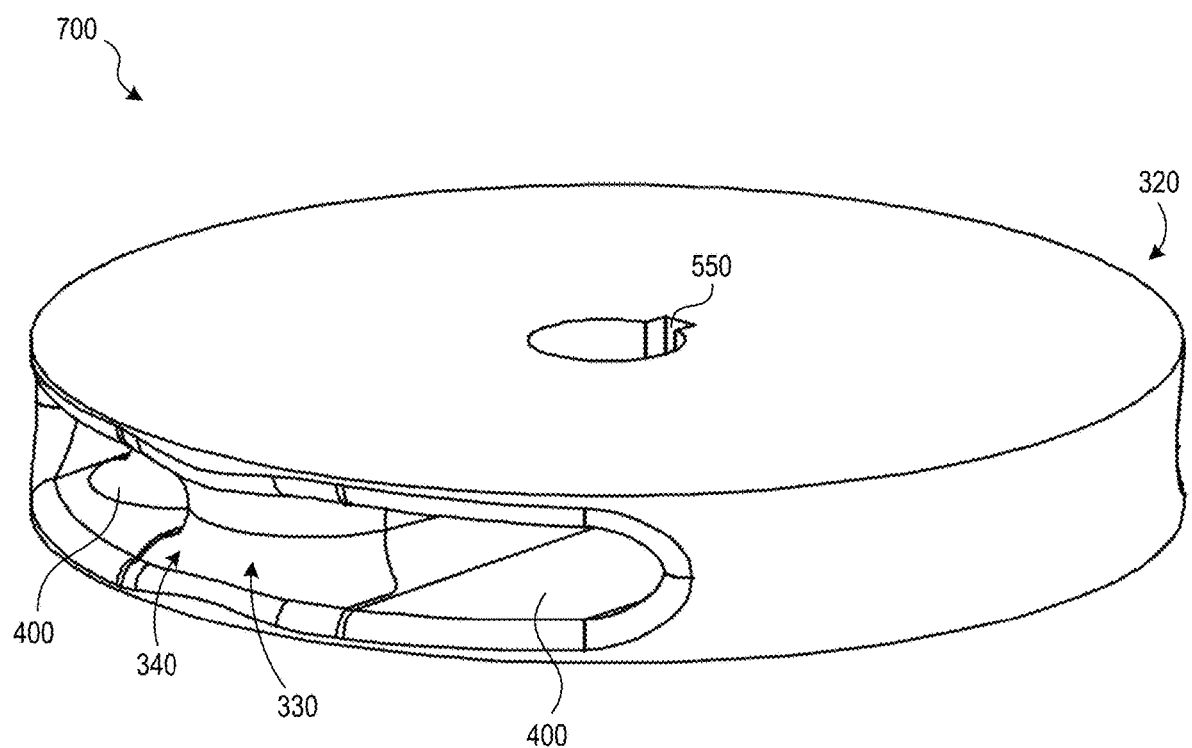
FIG. 7 illustrates a cutting head body configured in accordance with embodiments of the present technology.

FIG. 7 illustrates a cutting head body 700 configured in accordance with another embodiment of the present technology. In some embodiments, the cutting head body 700 may be generally similar to the cutting head body 250 described above, but it may include only one cutting level 340 with one inlet area 320, one outlet area 330, and one set of passageways 400 (one for each cutting-line portion 305).

In some embodiments, the cutting head body 700 may be a single, integral component or, in other embodiments, it may be formed in halves or other portions.

Figure 8:
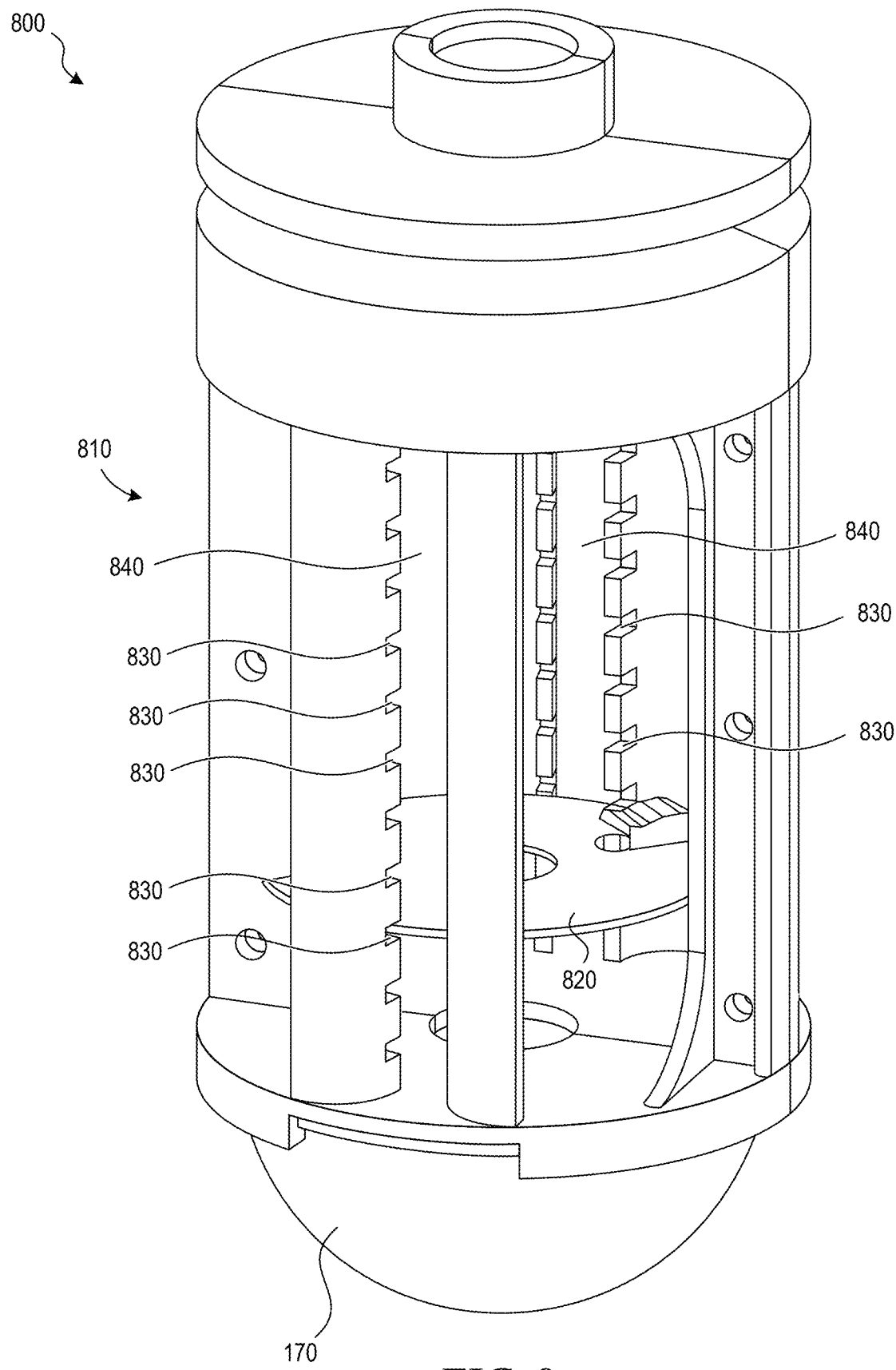
FIG. 8 illustrates a cutting head assembly configured in accordance with embodiments of the present technology.

FIG. 8 illustrates a cutting head assembly 800 configured in accordance with another embodiment of the present technology. In some embodiments, the cutting head assembly 800 may include a cage structure 810 supporting a bump head 170. The cutting head assembly 800 may be fixed to a rotating shaft, or it may be driven around a fixed shaft using a pulley attached to the cutting head assembly 800. In some embodiments, the cutting head assembly 800 includes a height-adjustable plate element 820 that a user may move up and down by positioning the plate element 820 in selected slots 830 (only some of the slots 830 are indicated in FIG. 8). Such height adjustability enables a user to select the height of one or more cutting lines 160 (not shown) relative to the ground. One or more elements on the plate element 820 may grasp the cutting lines 160 (for example, one or more finger elements or other elements suitable for holding the cutting lines 160 to the plate element 820). One or more cutting lines 160 may extend out of the vertical openings 840 in the cage structure 810.

Components of the present technology may be formed with any materials suitable for providing requisite durability. For example, components may be made with plastic materials, metal materials, composite materials, or other materials. In some embodiments, some components may be made of one material while other components may be made of other materials. In some embodiments, components may all be made with the same material or materials.

Embodiments of the present technology provide several advantages. For example, the cutting head bodies 150, 250 described with regard to FIGS. 1-7, and the cutting head assembly 800 described with regard to FIG. 8, facilitate a reduction or elimination of moving parts in the cutting head, reduction of weight, reduction of overall part-count in a cutting head assembly, and reduction of manufacturing cost. The cutting line 160 is loaded and unloaded from the same side of the cutting head body 250. The cutting head body 250 does not include any moving parts, which avoids complications associated with mechanisms being jammed with dirt or debris. Cutting head bodies and cutting head assemblies configured in accordance with several embodiments of the present technology (for example, the embodiments described with regard to FIGS. 1-7) provide a generally monolithic cylindrical shape without large gaps, which minimizes "weed wrap."

From the foregoing, it will be appreciated that specific embodiments of the presently disclosed technology have been described herein for purposes of illustration but that various modifications may be made without deviating from the scope of the technology. For example, single parts may be formed as multiple components, or separate parts may be combined into integral components (such as the driven pulleys, which may be formed integrally with the cutting head bodies, or which may be separate from the cutting head body and attached to the cutting head body). Although the technology is described in the context of a trimmer or mower with a motor, embodiments of the present technology include cutting heads, cutting-head assemblies, or other components of the present technology as individual aftermarket parts or kits of parts. Aspects of the technology described in the context of particular embodiments may be combined or eliminated in other embodiments.

Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. To the extent any materials incorporated herein by reference conflict with the present disclosure, the present disclosure controls.

What is claimed is:

1. A cutting head assembly comprising a cutting head body configured to receive and hold a cutting line, the cutting head body comprising:
    an inlet area comprising a cavity with a node location configured to receive a node in a cutting line;
    an outlet area comprising a cavity configured to open to an exterior of the cutting head body;
    a first passageway connecting the inlet area to the outlet area and having a first discharge cavity opening to the outlet area; and
    a second passageway connecting the inlet area to the outlet area and having a second discharge cavity opening to the outlet area; wherein
    the cutting head body is rotatable about a rotational axis of the cutting head assembly; and
    the first passageway is positioned between the second passageway and the rotational axis.

2. The cutting head assembly of claim 1 wherein the cutting head body comprises two portions connected together, wherein the portions meet along the rotational axis of the cutting head assembly.

3. The cutting head assembly of claim 2 wherein the portions are identical halves of the cutting head body.

4. The cutting head assembly of claim 1, further comprising a bump head.

5. The cutting head assembly of claim 1, comprising the cutting line, wherein the cutting line comprises a single cutting line with a node positioned approximately halfway along its length.

6. The cutting head assembly of claim 5 wherein the node is a knot in the cutting line, a clamp on the cutting line, or a protuberance on the cutting line.

7. The cutting head assembly of claim 1 wherein the second passageway is at least partially separated from the first passageway by a dividing structure.

8. The cutting head assembly of claim 1 wherein one or both passageways include a generally straight pathway between the inlet area and the outlet area, wherein a cutting line installed in the cutting head body may be generally straight between the inlet area and the outlet area.

9. The cutting head assembly of claim 1 wherein the only retention feature for a cutting line is the inlet area.

10. The cutting head assembly of claim 1 wherein the inlet area, the outlet area, the first passageway, and the second passageway are positioned on a first level of the cutting head body, and wherein the cutting head body further comprises one or more additional levels including additional inlet areas, outlet areas, and passageways, wherein the cutting head assembly is configured to provide multiple cutting heights.

11. The cutting head assembly of claim 1, further comprising a rotating driveshaft, wherein the cutting head body is supported on the rotating driveshaft to rotate with the rotating driveshaft, and wherein the cutting head body is coaxial with the rotating driveshaft.

12. The cutting head assembly of claim 11, further comprising a pulley connected to the rotating driveshaft to rotate the driveshaft.

13. The cutting head assembly of claim 1, further comprising a fixed shaft, wherein the cutting head body is rotatable about the fixed shaft.

14. The cutting head assembly of claim 13, further comprising a pulley connected to the cutting head body and rotatable about the fixed shaft.

15. The cutting head assembly of claim 7, wherein the dividing structure extends a full thickness of the first and second passageways between a bottom of each of the first and second passageway and a top of each of the first and second passageway.

* * * * *